(12) United States Patent  
Nebolon et al.

(10) Patent No.: US 7,420,461 B2  
(45) Date of Patent: Sep. 2, 2008

(54) CASTER-LOCK WITH DUAL RECEIVERS

(75) Inventors: Joseph F. Nebolon, Del Mar, CA (US); David A. Poirier, Escondido, CA (US); John R. French, San Diego, CA (US)

(73) Assignee: Carttronics, LLC, San Diego, CA (US)

( * ) Notice: Subject to any disclaimer, the term of this patent is extended or adjusted under 35 U.S.C. 154(b) by 110 days.

(21) Appl. No.: 11/617,587

(22) Filed: Dec. 28, 2006

(65) Prior Publication Data

US 2008/0158013 A1  Jul. 3, 2008

(51) Int. Cl.  
*B60R 25/10* (2006.01)

(52) U.S. Cl. .............................. 340/426.11; 340/568.5; 188/1.12

(58) Field of Classification Search ............ 340/426.11, 340/568.5, 531, 933, 935, 426.16, 825.69; 188/1.12  
See application file for complete search history.

(56) References Cited

U.S. PATENT DOCUMENTS

| | | | |
|---|---|---|---|
| 3,652,103 A | 3/1972 | Higgs | |
| 4,242,668 A | 12/1980 | Herzog | |
| 4,591,175 A | 5/1986 | Upton et al. | |
| 4,772,880 A * | 9/1988 | Goldstein et al. | 340/568.5 |
| 5,194,844 A * | 3/1993 | Zelda | 340/426.11 |
| 5,315,290 A | 5/1994 | Moreno et al. | |
| 5,374,921 A | 12/1994 | Martin et al. | |
| 5,823,302 A | 10/1998 | Schweninger | |
| 5,881,846 A | 3/1999 | French et al. | |
| 6,053,768 A * | 4/2000 | Chiang | 439/571 |
| 6,125,972 A * | 10/2000 | French et al. | 188/1.12 |
| 6,173,817 B1 | 1/2001 | Gray | |
| 6,362,728 B1 * | 3/2002 | Lace et al. | 340/426.11 |
| 6,975,205 B1 * | 12/2005 | French et al. | 340/5.92 |
| 2004/0239507 A1 * | 12/2004 | Neary et al. | 340/573.4 |

FOREIGN PATENT DOCUMENTS

| | | | |
|---|---|---|---|
| WO | 9513953 A1 | 5/1995 | |
| WO | 9520515 A1 | 8/1995 | |

* cited by examiner

*Primary Examiner*—Phung Nguyen  
(74) *Attorney, Agent, or Firm*—Nydegger & Associates

(57) ABSTRACT

A locking system for stopping a shopping cart includes a caster that can be selectively disabled when the cart encounters an electronic barrier. The caster includes a brake that is mounted on the frame of the caster. Also mounted on the frame are two receivers for separately receiving different signals from an electronic barrier. Respective decoders on the frame decipher lock commands in the signals, and a controller selectively activates the brake to prevent further movement of the cart in response to the lock commands. The electronic barrier can include an underground loop antenna and an above-ground RF beacon.

20 Claims, 1 Drawing Sheet

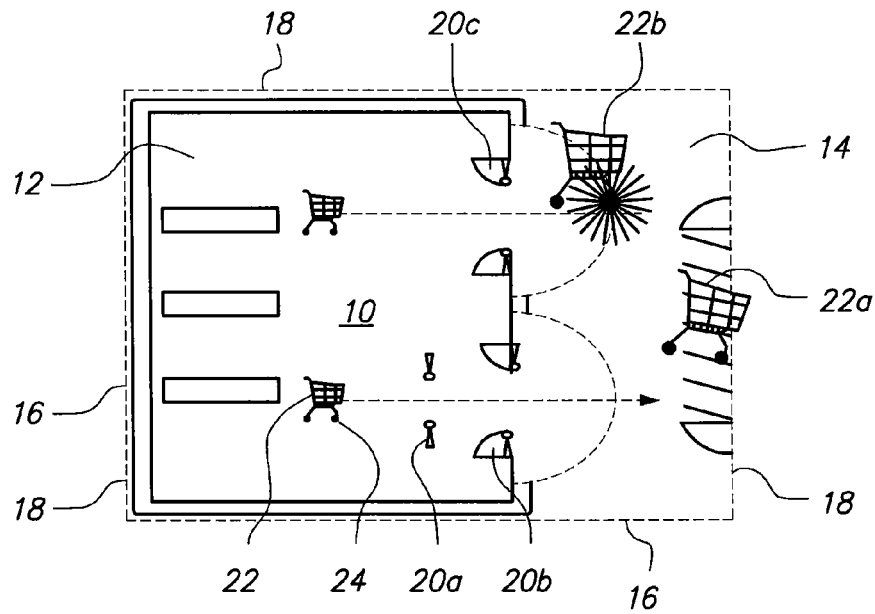
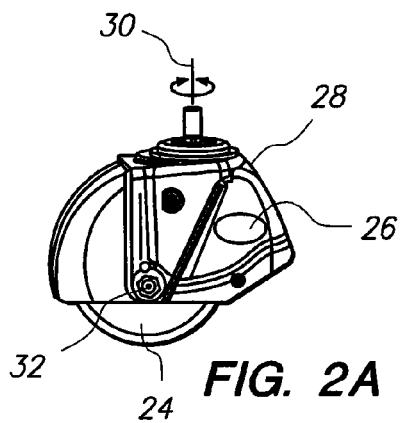
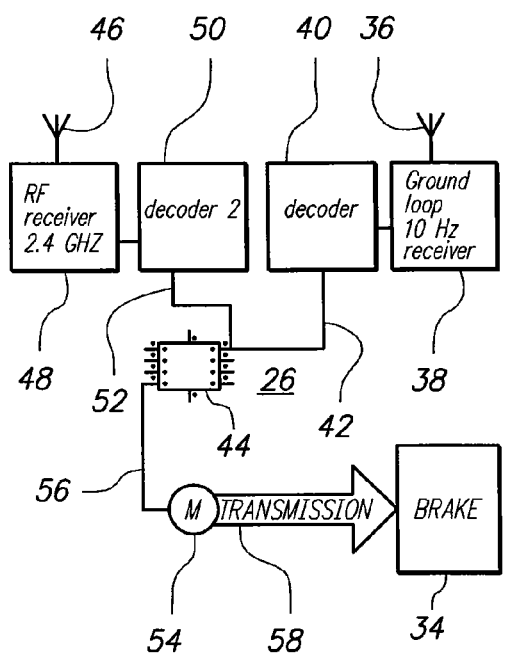
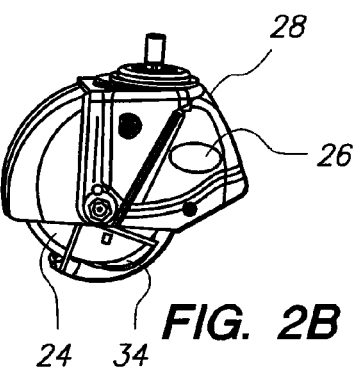

CASTER-LOCK WITH DUAL RECEIVERS

FIELD OF THE INVENTION

The present invention pertains generally to electronic security and theft prevention systems. More particularly, the present invention pertains to alarm systems that detect when a vehicle encounters an electronic barrier. The present invention is particularly, but not exclusively, useful as an electronic security and theft prevention system that incorporates above-ground RF beacons, together with underground antennas, to establish an electronic barrier that will selectively disable a vehicle and thereby prevent its removal from a defined area.

BACKGROUND OF THE INVENTION

For any of several reasons it may be desirable to control the movement of a vehicle as it is being used. For instance, it may be desirable to confine or limit the movement of the vehicle to within a specifically defined area. It may also be desirable to selectively disable the vehicle and thereby prevent its further movement within the defined area. This capability can be particularly important when the vehicle (e.g. a shopping cart) is temporarily loaned or provided to an individual (e.g. a customer) for movement through a defined area (e.g. a shopping center and its contiguous parking lot). Obviously, in such situations, a primary objective is theft prevention.

To prevent the movement of vehicles from a defined area that is relatively large (e.g. several acres), practical considerations tend to dictate that the most cost effective way to control the situation is through the employment of electronic means. This then requires the generation of a signal, and an appropriate response to the signal. For theft prevention purposes, the activating signal needs to be generated at known locations (i.e. at the perimeter of a defined area, or at predetermined locations within the defined area). As is well known, such signals can be transmitted as electromagnetic waves between a transmitter and a receiver.

Depending on how they are to be used, electronic barriers can be established in several different ways. For example, U.S. application Ser. No. 11/386,877, assigned to the same assignee as the present invention, considers activation signals that are transmitted from either above-ground RF beacons or from underground loop antennas (i.e. buried cables). When complex or extended perimeters are involved, however, using only one type transmitter may be less than completely effective. Instead, such situations may be best served using different kinds of antennas. For instance, along extended portions of a perimeter, an underground loop antenna (i.e. buried cable) may be preferable. On the other hand, RF beacons that can direct their beams to locations and areas around structures that would otherwise be difficult to cover by a buried cable may be more cost effective in specific situations. Other aspects also need to be considered. For example, unlike buried cable which is effectively stationary, RF beacons are more easily moved and can be used intermittently at several different locations. In any event, as is well known, underground loop antennas, and above-ground RF beacons, present different installation and different operational considerations. Importantly, different systems require different transmitters and different receivers.

In light of the above, it is an object of the present invention to provide a locking system for disabling a vehicle that interacts with electronic barriers having either above-ground or underground transmitters. Another object of the present invention is to provide a vehicle locking (disabling) system that effectively prevents the removal of a vehicle from within a defined area whenever it encounters an electronic barrier. Yet another object of the present invention is to provide a vehicle locking (disabling) system that can be easily incorporated for use with other electronic inventory assessment and surveillance systems. Another object of the present invention is to provide a vehicle locking system that is easy to use, simple to manufacture, and comparatively cost effective.

SUMMARY OF THE INVENTION

In accordance with the present invention, a locking system is provided for disabling a vehicle (e.g. a shopping cart) in a manner that causes little, if any, damage to the vehicle. The purpose is to prevent removal of the cart from a defined area or stop further movement of the vehicle in the area. Preferably the locking (disabling) system is affixed to the swivel frame of a caster on the vehicle (shopping cart), and it is activated whenever the cart encounters a pre-established electronic barrier. As envisioned for the present invention, this electronic barrier will be established by the combination of an underground loop antenna and an array of above-the-ground RF beacons. More specifically, the electronic barrier will be established along all, or part, of the perimeter of a defined area, and can include specific barriers at selected locations within the defined area.

In detail, the locking system of the present invention includes a braking mechanism that is affixed to the caster yoke (frame). Additionally, a first receiver is mounted on the yoke (frame) for receiving a first signal, and a second receiver is mounted on the yoke (frame) for receiving a second signal. Each receiver is connected to a respective antenna, and to a respective signal decoder. The system further includes a controller that is connected to the first and second receivers, via their respective decoders, and to the braking mechanism.

As envisioned for the present invention, an electronic barrier is erected to interact with vehicles (shopping carts) whenever the vehicle encounters the barrier. The result of this encounter is an immediate activation of the braking mechanism on the vehicle. This is accomplished by signals that are transmitted from the electronic barrier to the vehicle. In variations of this feature, rather than initiating a braking action, the signals that are transmitted from the barrier can be used to electrically cut off the power being used to move the vehicle (e.g. an electric cart). In still another aspect of the present invention, the transmitted signals can be used to activate audio-enunciators on the vehicle. For example, the operator of a wheelchair, or a person carrying a shopping basket, can be somehow informed of their proximity to the barrier and instructed what to do or where to go.

For extended lengths of the electronic barrier, it is envisioned that a buried, underground cable will serve as a loop antenna for transmitting a lock signal to the vehicle. On the other hand, for isolated locations, complex constructions, or temporary uses, an above-ground RF antenna may be more appropriate. The present invention works well with either antenna.

In operation, a vehicle (shopping cart) with a system of the present invention mounted on one of its casters is able to move freely through a defined area. For example, the defined area may be a shopping mall and its contiguous parking lot. Within this environment, when the vehicle encounters an electronic barrier that has been erected along the perimeter of the defined area, a signal from the barrier is received by one of the receivers in the caster. By way of example, a first antenna that is connected to the first receiver can be set to receive signals from an underground loop antenna. In this case, the signal (i.e. a first signal) will preferably have a frequency of approximately 10 kHz. This first signal is then passed from the first receiver to a first decoder where it is deciphered to identify a lock signal. If received, the lock signal can then be transmitted to the braking mechanism to stop the cart. Similarly, a second antenna that is connected to the second receiver can be set to receive signals from an above-ground RF beacon. In this case the signal (i.e. a second signal) will preferably have a frequency of approximately 2.4 GHz and a range of ten to fifty feet. This second signal is then passed from the second receiver to a second decoder where it is deciphered to identify a lock signal. As is done with lock signals received by the first receiver, the second lock signal will also be transmitted to the braking mechanism to stop the cart.

Operationally, the signals that are transmitted from the electronic barrier can have selected signal strengths. For instance, the underground loop antenna can transmit its first signals for receipt by the locking system whenever the first antenna is within a predetermined distance (e.g. ten-fifty feet) from the underground antenna. Similarly, signals transmitted from above-ground RF beacons can be directed into specific locations for receipt by the locking system whenever the locking system is within approximately ten to fifty feet from the RF beacon.

Additional aspects of the present invention that may be important for the operation of the locking system include the capability of establishing a time delay for a response to the lock signal. For instance, within the defined area, the vehicle may pass a location where it is not desirable to actually stop the vehicle, but rather limit its further use to a time certain (e.g. five minutes). Most likely, this time delay feature would be employed with the more mobile, above-ground RF beacons. In another aspect of the present invention, due to signal radiation considerations, it may be desirable to install the second receiver as a transceiver. If used in this capacity, the transceiver can be commanded to transmit identification, location, and time information about the vehicle to a central location.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is a schematic diagram of a defined area in accordance with the present invention;

FIG. 2A is an elevation view of a caster for a shopping cart incorporating the present invention;

FIG. 2B is a view of the caster shown in FIG. 2A with the braking mechanism activated; and FIG. 3 is a schematic diagram of the component elements of an electrical circuit in accordance with the present invention.

DESCRIPTION OF THE PREFERRED EMBODIMENTS

Referring initially to FIG. 1, an area for protection by the present invention is shown and generally designated 10. As shown, the area 10 may include a shopping mall 12 and a parking lot 14. The mall 12 and parking lot 14, however, are only exemplary and are not limiting in their configuration. As will be easily appreciated, the area 10 can have many different configurations.

As shown in FIG. 1, the area 10 is defined by an extended perimeter 16 that surrounds both the mall 12 and the parking lot 14. An underground loop antenna 18 can be positioned along all, or along selected portions, of this perimeter 16. For purposes of disclosure, the underground loop antenna 18 and the perimeter 16 are coincident and are represented together in FIG. 1 by a dashed line. FIG. 1 also indicates that a plurality, but at least one, above-the-ground RF beacon 20 can be positioned at selected locations within the area 10 (the RF beacons 20a-c are exemplary). As envisioned by the present invention, the underground loop antenna 18 is used to transmit a signal with a relatively low frequency (e.g. 10 kHz). On the other hand, the above-the-ground RF beacons 20 are used to transmit a signal having a relatively high frequency (e.g. 2.4 GHz). Together, the loop antenna 18 and the RF beacon(s) 20 create an electronic barrier for the area 10.

Still referring to FIG. 1, it will be appreciated that the present invention envisions a plurality of vehicles 22 (e.g. shopping carts) that can be moved around, within the area 10. In accordance with the present invention, however, the carts 22 will become disabled whenever they contact the electronic barrier (i.e. loop antenna 18 and RF beacons 20). Thus, the carts 22 are not free to be taken away from the area 10, or to be moved into prohibited locations within the area 10. In accordance with the present invention, this objective is accomplished by providing each cart 22 with a wheel 24 that incorporates a locking system 26.

In FIG. 2A it will be seen that the wheel 24 of a cart 22 is mounted on a swivel frame 28. More specifically, the swivel frame 28 is mounted as a caster on the cart 22 for rotation about an axis 30. Further, the wheel 24 is mounted on the swivel frame 28 for rotation about an axis 32 that is substantially perpendicular to the axis 30. The locking system 26 is then mounted on the swivel frame 28. Functionally, the locking system 26 of the present invention is used to activate a braking mechanism 34 that will somehow disable the cart 22 from being moved. Although the braking mechanism 34 shown in FIG. 2B is a braking shell that will lift the wheel 24 from the ground, to thereby disable the cart 22 from further movement, other mechanisms can be used for this purpose. For example, a braking shell as disclosed in U.S. Pat. No. 6,125,972, which is assigned to the same assignee as the present invention, is suitable for use with the present invention. As will be appreciated by the skilled artisan, however, the braking mechanism 34 can be any device known in the pertinent art that will somehow prevent the wheel 24 from providing movement for the cart 22.

In FIG. 3 the locking system 26 is shown to include an antenna 36 with an associated receiver 38. Together, these components are provided to receive signals from the loop antenna 18 (approximate frequency 10 kHz). The received signals are then deciphered by a decoder 40 to determine whether the signal contains a "lock signal" 42. If a signal, in fact, comes from the loop antenna 18, it will have such a "lock signal" 42. The "lock signal" 42 will then be sent to a controller 44. Similarly, the locking system 26 also includes an antenna 46 with an associated receiver 48 for receiving signals from the RF beacons 20 (approximate frequency 2.4 GHz). These signals are then deciphered by a decoder 50 to determine whether they contain a "lock signal" 52. If so, like "lock signal" 42, the "lock signal" 52 is sent from the decoder 50 to the controller 44. Whenever the controller 44 is in receipt of a "lock signal" 42/52, a motor 54 is started by an activation signal 56 and a transmission 58 causes the braking mechanism 34 to disable the vehicle (cart) 22.

OPERATION

For the operation of the present invention, FIG. 1 shows that the vehicles (carts) 22 are generally free to move about within the defined area 10 (i.e. within the space surrounded by the underground loop antenna 18). As specifically shown for the cart 22a, however, whenever any cart 22 comes within a predetermined distance of the loop antenna 18 (e.g. ten-fifty feet), the antenna 36 and receiver 38 of the locking system 26 will receive a signal. In accordance with the above disclosure, the received "lock signal" 42 will then cause the controller 44 to activate the braking mechanism 34. In turn, this activation will disable the cart 22a and cause it to stop at the perimeter of the area 10, as shown.

At selected locations inside the area 10, it may be more advantageous to use RF beacons 20 than it would be to use a buried, underground cable, such as loop antenna 18. This can be so for several different reasons, such as the cost and convenience considerations mentioned above. In any event, as illustrated by the plight of vehicle (cart) 22b in FIG. 1, if it is desirable to disable a cart 22b inside the area 10, an RF beacon 20 may be employed for this purpose. In this case, whenever a cart 22 comes within a predetermined distance of an RF beacon 20 (e.g. ten-fifty feet), the antenna 46 and receiver 48 will receive a signal from the RF beacon 20. Again, in accordance with the above disclosure, a received "lock signal" 52 will cause the controller 44 to activate the braking mechanism 34. This will then disable and stop the cart 22b at any predetermined location within the area 10.

Although FIG. 1 depicts separate carts 22a and 22b, they may in fact be the same cart 22. The point here is that all carts 22, depending on where they may be within the area 10, can be stopped either by the loop antenna 18 or by an RF beacon 20.

It is also to be appreciated by the skilled artisan that time delays can be programmed into the operation of the present invention. For example, the cart 22 may pass by an RF beacon 20a and receive an initial signal that includes a predetermined time delay (e.g. five minutes). Unless this signal is deactivated by passing near another predetermined RF beacon 20 (e.g. RF beacon 20b), the "lock signal" 52 will be passed to the controller 44 for activation of the braking mechanism 34. On the other hand, if RF beacon 20b deactivates the signal, the cart 22 can continue moving within the area 10 without further incident.

In an alternate embodiment of the present invention, the receiver 48 can be a transceiver. In this case, the transceiver 48 can be used to broadcast signals from a cart 22 over antenna 46. These signals can provide information to a central control (not shown) as desired. For instance, the transmitted information may include identification data about the cart 22, as well as its time and location within the area 10.

While the particular Caster-Lock With Dual Receivers as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A locking system for disabling a vehicle to prevent its removal from a defined area which comprises:
   a braking mechanism mounted on the vehicle to prevent movement of the vehicle when the braking mechanism is activated;
   a first receiver mounted on the vehicle for receiving a first signal;
   a second receiver mounted on the vehicle for receiving a second signal; and
   a controller respectively connected to the first receiver, to the second receiver and to the braking mechanism for receiving the first and second signals and selectively activating the locking mechanism in response thereto.

2. A system as recited in claim 1 further comprising:
   a first decoder connected between the first receiver and the controller for identifying a lock command in the first signal; and
   a second decoder connected between the second receiver and the controller for identifying a lock command in the second signal.

3. A system as recited in claim 1 further comprising a first antenna mounted on the vehicle and connected to the first receiver for receiving the first signal, wherein the first signal has a frequency of approximately 10 kHz, and wherein the first signal is received when the first antenna is within a predetermined distance from an underground antenna and the underground antenna is transmitting the first signal.

4. A system as recited in claim 1 wherein the predetermined distance is ten to fifty feet.

5. A system as recited in claim 1 further comprising a second antenna mounted on the vehicle and connected to the second receiver for receiving the second signal, wherein the second signal has a frequency of approximately 2.4 GHz.

6. A system as recited in claim 5 wherein the second signal is received by the second receiver from an RF beacon when the second antenna is within approximately ten to fifty feet from the RF beacon.

7. A system as recited in claim 5 wherein the second receiver is a transceiver.

8. A system as recited in claim 7 wherein the transceiver transmits an identification signal.

9. A system as recited in claim 1 wherein the controller establishes a time delay upon receipt of the second signal for activation of the locking mechanism at a predetermined time interval after receipt of the second signal.

10. A system as recited in claim 9 wherein the time interval is five minutes.

11. A caster for use on a shopping cart which comprises:
    a swivel frame attached to the cart for rotation thereof about a first axis;
    a wheel for moving the cart, wherein the wheel is mounted on the frame for rotation about a second axis, and wherein the second axis is substantially perpendicular to the first axis;
    a brake means mounted on the frame for stopping a rotation of the wheel to disable the cart and prevent further movement thereof;
    a first receiver mounted on the frame for receiving a first signal;
    a second receiver mounted on the frame for receiving a second signal; and
    a controller respectively connected to the first receiver, to the second receiver and to the brake means for receiving the first and second signals and selectively activating the brake means in response thereto.

12. A caster as recited in claim 11 further comprising:
    a first decoder connected between the first receiver and the controller for identifying a lock command in the first signal; and
    a second decoder connected between the second receiver and the controller for identifying a lock command in the second signal.

13. A caster as recited in claim 11 further comprising:

a first antenna mounted on the frame and connected to the first receiver for receiving the first signal, wherein the first signal has a frequency of approximately 10 kHz, and wherein the first signal is received when the first antenna is within a predetermined distance from an underground antenna and the underground antenna is transmitting the first signal; and a second antenna mounted on the frame and connected to the second receiver for receiving the second signal, wherein the second signal has a frequency of approximately 2.4 GHz.

14. A caster as recited in claim 13 wherein the second signal is received by the second receiver from an RF beacon when the second antenna is within approximately ten to fifty feet from the RF beacon, and wherein the second receiver is a transceiver for transmitting an identification signal.

15. A caster as recited in claim 14 wherein the controller establishes a time delay upon receipt of the second signal for activation of the locking mechanism at a predetermined time interval after receipt of the second signal.

16. A caster as recited in claim 11 wherein the brake means clamps onto the wheel.

17. A caster as recited in claim 11 wherein the brake means lifts the wheel from contact with a surface.

18. A method for manufacturing a caster for use on a shopping cart which comprises the steps of:

attaching a swivel frame to the cart for rotation of the frame about a first axis;

mounting a wheel on the frame for moving the cart, the wheel being mounted for rotation about a second axis, wherein the second axis is substantially perpendicular to the first axis;

locating brake means on the frame to stop a rotation of the wheel and disable the cart to prevent further movement of the cart;

affixing a first receiver to the frame for receiving a first signal and a second receiver to the frame for receiving a second signal;

positioning a controller on the frame; and connecting the controller to the first receiver, to the second receiver and to the brake means for receiving the first and second signals and selectively activating the brake means in response thereto.

19. A method as recited in claim 18 further comprising the steps of:

connecting a first decoder between the first receiver and the controller for identifying a lock command in the first signal; and connecting a second decoder between the second receiver and the controller for identifying a lock command in the second signal.

20. A method as recited in claim 19 further comprising the steps of:

mounting a first antenna on the frame to receive the first signal, wherein the first signal has a frequency of approximately 10 kHz, and wherein the first signal is received when the first antenna is within a predetermined distance from an underground antenna and the underground antenna is transmitting the first signal; and mounting a second antenna on the frame to receive the second signal, wherein the second signal has a frequency of approximately 2.4 GHz.

* * * * *